Sept. 7, 1943.　　　　J. OTTMAR　　　　2,329,131

THERMAL ELEMENT

Filed Aug. 14, 1940

Jerome Ottmar
Inventor

Haynes and Koenig
Attorneys

Patented Sept. 7, 1943

2,329,131

UNITED STATES PATENT OFFICE 2,329,131

THERMAL ELEMENT

Jerome Ottmar, Attleboro, Mass., assignor to Metals & Controls Corporation, Attleboro, Mass., a corporation of Massachusetts Application August 14, 1940, Serial No. 352,530

7 Claims. (Cl. 60—23)

This invention relates to thermostatic elements, and more particularly, to thermostatic elements wound in the form of a helix such as shown and described in Parsons Patent 2,121,259.

Among the objects of the invention may be noted the provision of a simple and compact thermostatic element such as shown in said Parsons patent, which is quickly responsive to thermal changes; the provision of such a thermostat which has heating means in close association therewith; and the provision of a thermostatic element of the class described, which is responsive to relatively small amounts of heat. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing in which are illustrated several exemplary embodiments of the invention, Fig. 1 is a side elevation of a thermostatic element;

Similar reference characters indicate corresponding parts throughout the several views of the drawing.

The present invention refers to composite thermostat elements of the type shown and described in Parsons Patent No. 2,121,259, and to thermostats embodying these composite elements. An element of this type may be made by first winding progressively about a first axis a relatively narrow strip of composite thermostatic metal, such as bimetal, into a helical form having a relatively small diameter. This minor helix or helicoidal member is then wound progressively about a second axis as a second or major helical form of relatively large diameter, thus forming a compound or double helical thermostatic element, or a peripherally continuous operating member, as described in said Parsons Patent 2,121,259. The composite metal, or bimetal helix, or spring, so formed, will expand or contract lengthwise with change of temperature. The amount of movement for a given temperature change is controlled by the relation between the various dimensions of the element, and the direction of movement is controlled by the direction of the winding of the two helices and the relative position of the high and low expansion sides of the bimetal.

Figure 1:
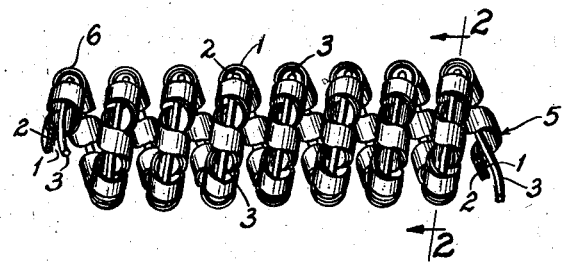

Referring to the drawing, Fig. 1 shows a thermostatic element embodying a compound helix made in accordance with the Parsons patent above referred to. The thermostatic element is formed from a strip of composite metal 5 illustrated as composed of two layers 1 and 2. Positioned within the small or primary helix 6 is a heating wire 3 which extends throughout. This wire may be of any suitable construction, and may be suitably insulated, for example, with glass or asbestos. The composite metal may be wound on the wire in order to form the first helix, and this small or primary helix subsequently wound into a secondary or major helix, or the wire may be inserted into a preformed minor helix which may or may not have already been formed into a large helix.

Figure 2:
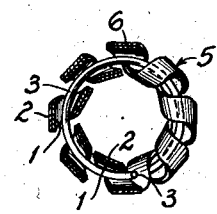
Fig. 2 is a cross section taken along the line 2—2 of Fig. 1.
Figure 3:
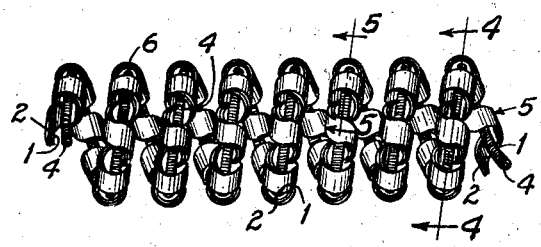
Fig. 3 is a side elevation of an alternative embodiment.
Figure 4:
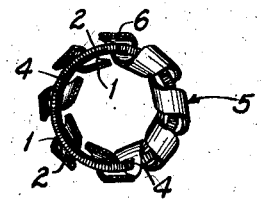
Fig. 4 is a cross section taken along the line 4—4 of Fig. 3.
Figure 5:
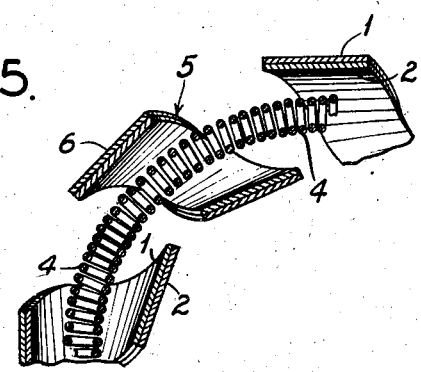
Fig. 5 is a section on an enlarged scale taken along the line 5—5 of Fig. 3.

Fig. 3 shows a construction similar to that of Figures 1 and 2, but the heating wire 4 is shown as of the coiled spring type which presents a relatively wide heating surface for a given space occupied by the wire. This spring wire is positioned in the same way as the wire 3 in Fig. 1; that is, within the smaller helix. The construction of this embodiment is similar to that previously described. The primary or small helix may be wound upon the heating spring or the helix may first be formed and the heating spring then inserted. The formation of the final or large helix may take place either before or after the insertion of the heating wire in position.

Positioning the heating means as shown, namely, within the primary or smaller helix of the thermostatic element or operating member, serves to improve the efficiency of the heat transmission, and minimizes heat losses. Placing the heating element in this location renders the thermostatic element quite sensitive and assures a uniform response (longitudinally considered) by the element to the heat to which it is subjected. All portions of the thermostatic element are thereby subjected to the same heating action. Overheating as well as failure to transmit the proper amount of heat to a given section is minimized.

Any of the commonly employed heating means may be utilized in constructing the present invention, the only requirement being that it shall be positioned within the primary or small helix.

This causes the major-sized coils of the heating means to assume substantially the same pitch distances at all points as the major coils of the composite strip in various positions of the latter.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

What is claimed is:

1. A thermostat comprising an operating member in the form of a compound primary and secondary coil composed of a strip of composite metal, and heating means within the primary coil and helically shaped substantially like the secondary coil.

2. A thermostatic element comprising a strip of composite metal extending progressively about a first axis which in turn is extended progressively about a second axis, and heating means extending along said first axis and located within the coils formed by said extension about said first axis.

3. A new article of manufacture comprising a thermostatic element movable along its axis when heated and comprising a bimetallic helix elongated in the direction of its axis, and composed of a coiled strip of bimetal, and heating means located within the coiled strip and shaped substantially like said bimetallic helix.

4. A thermostatic control member comprising a composite metallic strip twisted to form a helicoidal member which is coiled in a generally helical form, and heating means within said helicoidal member also coiled in said helical form.

5. A thermostatic control member comprising a composite metallic strip twisted to form a relatively long helicoidal member of relatively small diameter, and heating means within said helicoidal member, said helicoidal member and said heating means being axially coiled to form a peripherally continuous hollow member, the length of which changes with temperature.

6. A thermostatic control member comprising a composite metallic strip twisted to form minor coils about a first axis, said minor coils being twisted to form major coils about a second axis, and heating means forming coils extending along said first axis and being located within the minor coils, whereby the coils of the heating means are forced to assume substantially the same pitch distances at all points as said major coils of the composite strip in any of the various local positions of the latter.

7. A thermostatic control member comprising a composite metallic strip twisted to form minor coils about a first axis, said minor coils being twisted to form major coils about a second axis, and heating means extending along said first axis and being located within the minor coils, whereby the coils of the heating means are forced to assume substantially the same pitch distances at all points as said major coils of the composite strip in any of the various local positions of the latter, said heating means being twisted to form minor coils about an axis which substantially coincides with said first axis.

JEROME OTTMAR.